United States Patent

Sheu

[11] Patent Number: 5,791,741
[45] Date of Patent: Aug. 11, 1998

[54] WHEEL COVER CLASP STRUCTURE

[75] Inventor: Lih-Ching Sheu, Tainan Hsien, Taiwan

[73] Assignee: Kuan Hsieng Industrial Co., Ltd., Tainan City, Taiwan

[21] Appl. No.: 696,757

[22] Filed: Aug. 15, 1996

[51] Int. Cl.$^6$ .................................................. B60B 7/01
[52] U.S. Cl. .................................... 301/37.34; 301/37.24
[58] Field of Search ............................. 301/37.1, 37.31, 301/37.34, 37.35, 37.36, 37.42, 37.24

[56] References Cited

U.S. PATENT DOCUMENTS 5,509,725   4/1996   Citiu .............................. 301/37.36 X

FOREIGN PATENT DOCUMENTS 4012901   1/1989   Japan .............................. 301/37.36
4012902   1/1989   Japan .............................. 301/37.36

*Primary Examiner*—Russell D. Stormer
*Attorney, Agent, or Firm*—Panitch; Schwarze; Jacobs & Nadel, P.C.

[57] ABSTRACT

A wheel cover clasp structure includes a plurality of mounting bases positioned on the wheel cover and a plurality of clasps. Each mounting base has a front end, a rear end and a mounting hole. Each clasp is connectable to a separate mounting base and includes an insertion lock tab having an upper side and a lower side and a curved retainer piece. The insertion lock tab of each clasp is insertable into the mounting hole of the mounting base to which the clasp is connected and has at least two opposite sides. The insertion lock tab further includes an insertion lock section at a first end and a clasp lock section having two lateral hooks each protruding from a separate one of the two opposite sides at a second end. The retainer piece has a first end bent to form a transfer stop section and a second end bent in the same direction as the transfer stop section to form a curved clip section. During assembly, each insertion lock tab is placed between the transfer stop section and the clip section of a separate retainer piece and each retainer piece is inserted into the mounting hole of a separate mounting base so that the lateral hooks of the clasp lock section anchor each clasp to the mounting base. An interval between the insertion lock section of each insertion lock tab and the clip section of each retainer piece is established to retain the wheel cover on the wheel rim of a vehicle tire.

4 Claims, 5 Drawing Sheets

5,791,741

WHEEL COVER CLASP STRUCTURE

BACKGROUND OF THE INVENTION

1. Field of the Invention

The invention herein relates to a wheel cover clasp structure. The structure of the invention herein is simple and, furthermore, is suitable for utilization as a wheel rim cover or a wheel spoke cover that can be installed onto vehicle tires and wheel rims.

2. Description of the Related Art

Conventional compact car tires all utilize wheel covers installed between the steel rim and tires to cover and embellish the exterior of the tires and wheels. Traditionally called wheel covers, the term inclusively refers to both wheel rim and wheel spoke covers. Of these, the wheel rim cover, as indicated in FIG. 1, utilizes engraved holes (12) on the cover surface (11) of the wheel rim cover (1) near the outer circumference to enhance aesthetics and heat dissipation. On the rear side of the cover surface (11), as indicated in FIG. 2, the clasp structure mainly consists of a ring of mounting bases (2) positioned with a number of clasps (21) arranged at suitable intervals apart. Each clasp (21) is surrounded in between by spring coils (3) and the clasps (21) of the wheel rim cover (1) are utilized to push downwards for insertion against the outer circumference of the vehicle tire and rim. Wheel spoke covers utilized on vehicle tires and rims are generally constructed out of aluminum alloy and since the steel rim is already attractive in appearance, therefore, it is unnecessary to install the aforesaid wheel rim cover and aesthetic enhancement only requires the installation of a wheel spoke cover onto the protruding edge visible along the outer rim. As indicated in FIG. 3, conventional wheel spoke covers (4) are round in shape and have clasp slots (41) positioned at appropriate intervals around the rim and facing each the aforesaid clasp slots (41) are insertable clasps (5). The clasps (5) are metal strips formed by punching; formed on one end is an opening (51) and on each of the two sides of the opening (51) is a spring strip (52), and facing the other end of the opening (51) and formed in an inward curve is a hook section (53); and positioned near the center section and, furthermore, opposite from hook section (53) is clasp lock section (54).

Although the aforementioned clasp structures of the wheel rim cover (1) and wheel spoke cover (4) can be effectively installed through insertion onto the tire rim, the following disadvantages still remain:

(1) Since the length of the clasp (21) is longer, the packing materials involved when stacking the wheel rim covers (1) significantly increases the cost of factory storage, transport and shipping.

(2) Since the wheel spoke covers (4) are round in shape, the probability of dislodging while the tire is rotating is lower than that of wheel rim covers (1), therefore, an extremely high degree of insertion retaining force in not required. However, the hook section (53) and the clasp lock section (54) of the conventional clasp (5) are simultaneously clipped onto the rim of the tire, with the strength of the insertion onto the steel rim also serving as a force during disassembly. Since the clasp slots (41) on the wheel spoke cover (4) are fabricated out of thin plastic, when the force of the clips is relieved through the removal operation during disassembly, the clasp slots (41) are easily damaged and rendered unusable.

SUMMARY OF THE INVENTION

The objective of the invention herein is to provide an improved wheel cover clasp structure that includes mounting bases with mounting holes on the wheel cover and, furthermore, positioned on the mounting bases are clasps. Of which, the aforesaid clasps includes an insertion lock tab fabricated by bending and a curved retainer piece formed by folding a metal strip. The aforesaid insertion lock tab can be inserted into the mounting holes of the aforesaid mounting bases, and has an insertion lock section at one end and the lateral hooks of the clasp lock section protrude from each of the two sides at the other end. The aforesaid retainer piece is bent to one side to form a transfer stop section and at the other end, bent in the same direction as the aforesaid transfer stop section to form a curvature, is a clip section. The insertion lock tab is placed in between the transfer stop section and the clip section, and then fully inserted into the mounting holes in the mounting bases for anchoring; and the resulting interval in between the insertion lock section on the insertion lock tab and the clip section on the retainer piece can be utilized for insertion and installation between the vehicle tire and the wheel rim.

BRIEF DESCRIPTION OF THE DRAWINGS

Additional features and advantages of the invention herein will become apparent in the following detailed description of the preferred embodiments, with reference to the accompanying drawings, wherein.

DETAILED DESCRIPTION OF THE PREFERRED EMBODIMENTS

In the detailed description of the preferred embodiments of the invention herein, similar elements are indicated by the same reference numbers throughout the disclosure.

Figure 1:
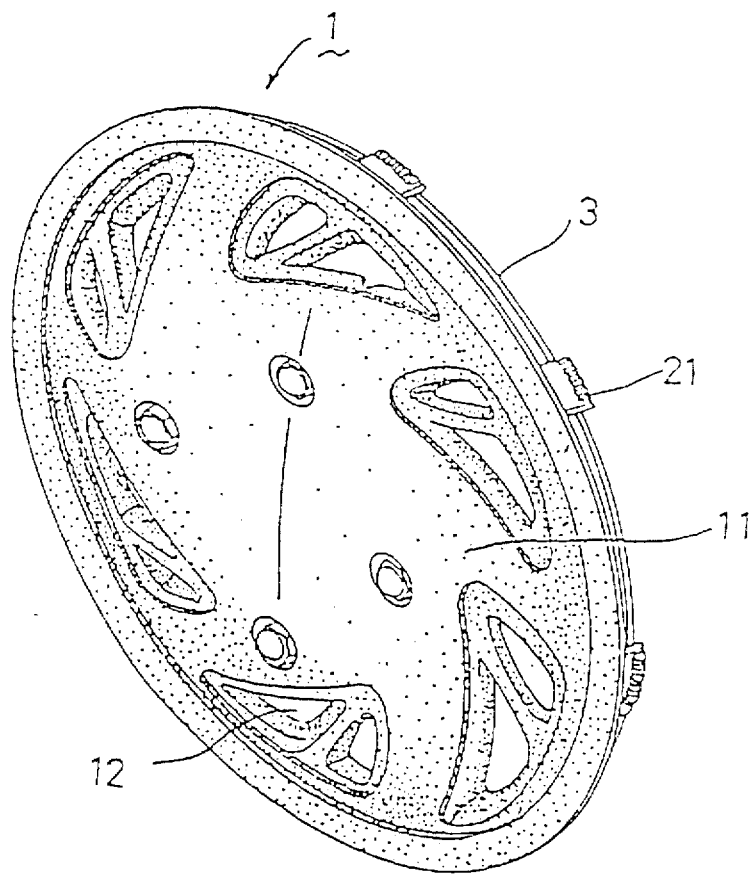
FIG. 1 is an isometric drawing of a conventional wheel rim cover.
Figure 2:
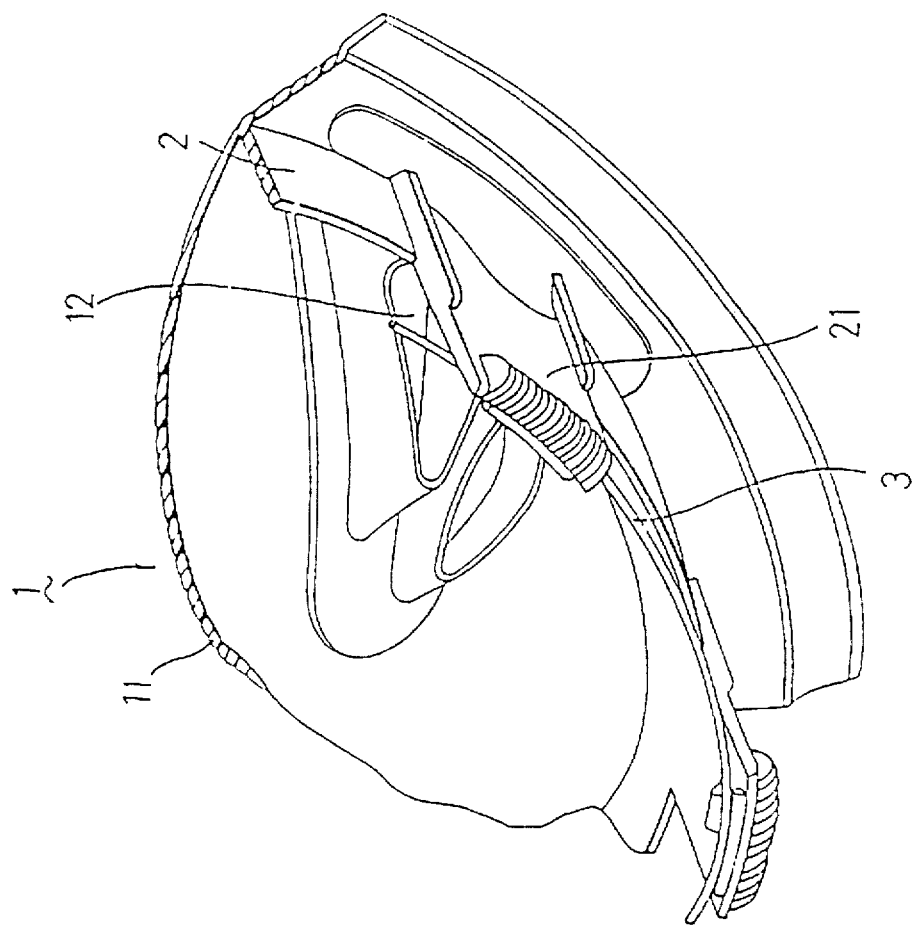
FIG. 2 is an isometric drawing of a conventional wheel rim cover structure.
Figure 3:
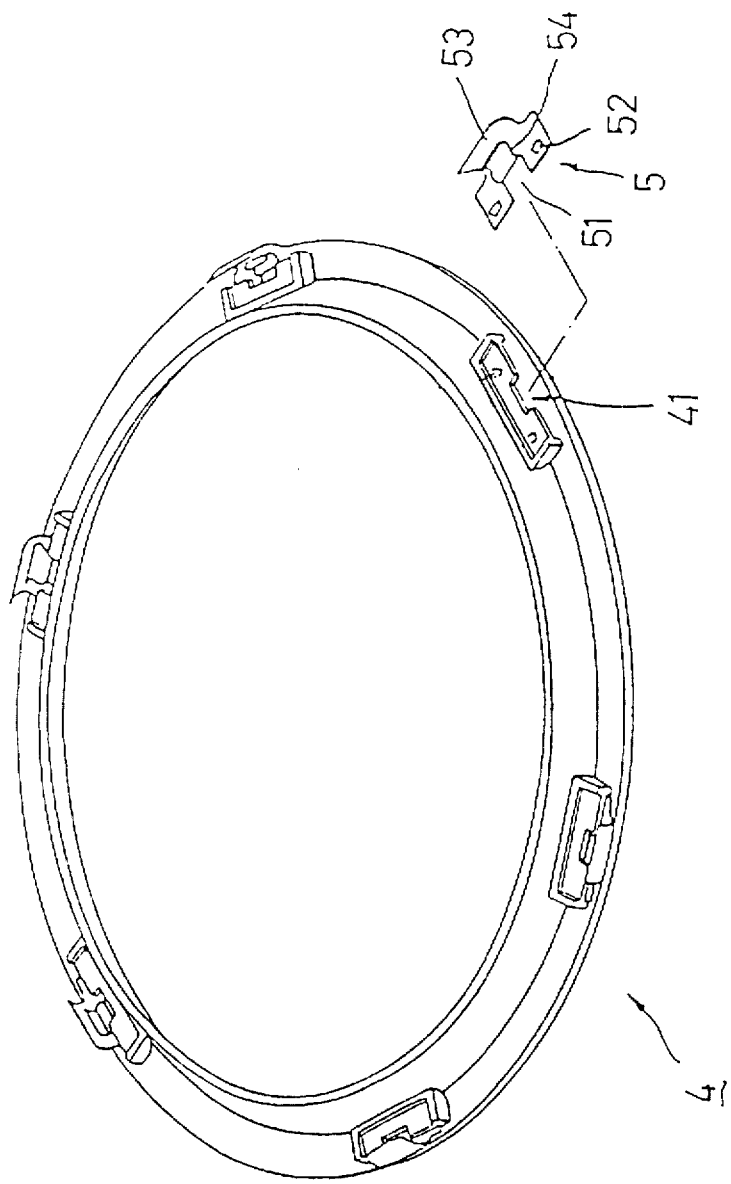
FIG. 3 is an exploded isometric drawing of a conventional wheel spoke cover structure.
Figure 4:
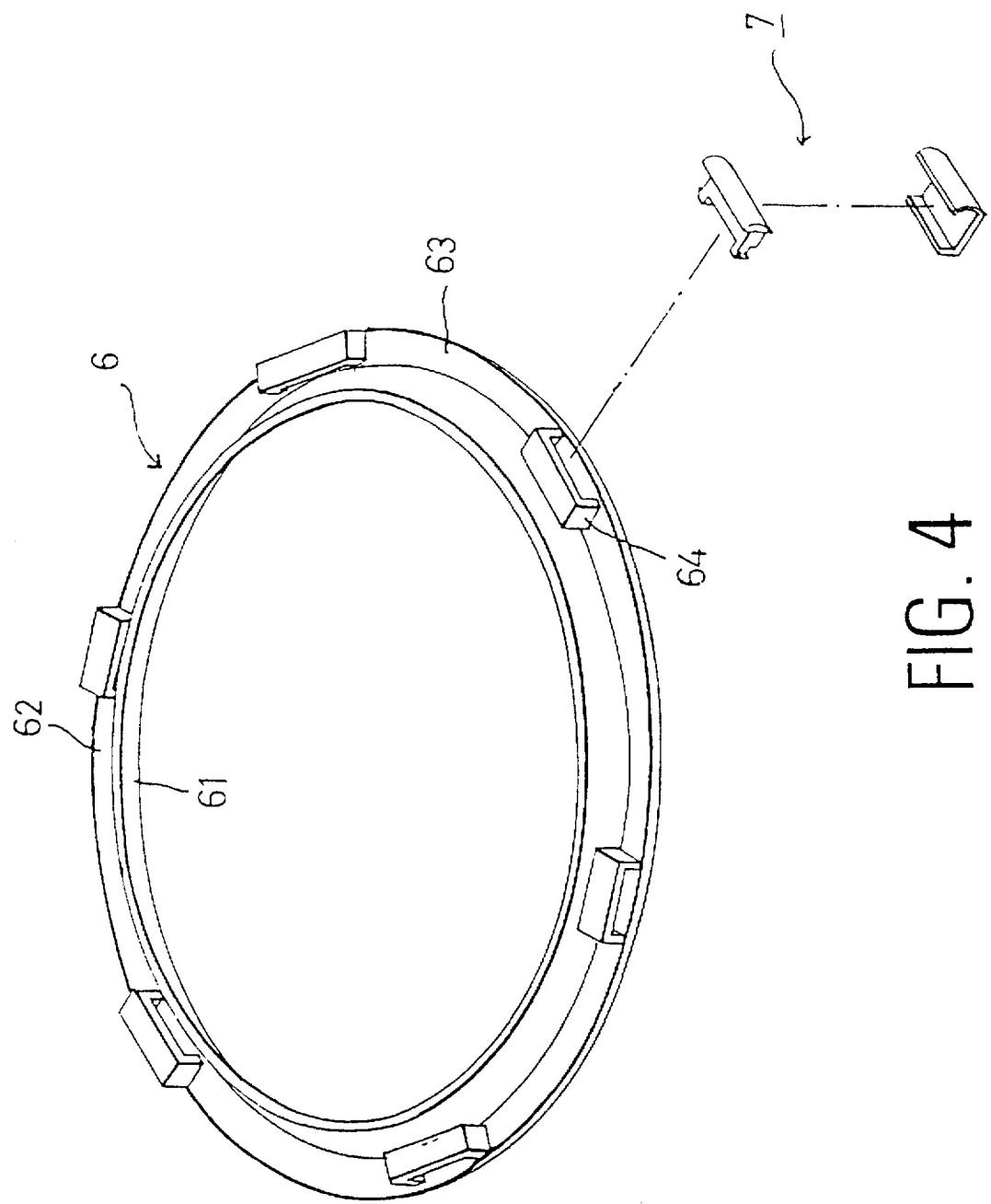
FIG. 4 is an exploded isometric drawing of the preferred embodiments of the invention herein as utilized on the wheel spoke cover.
Figure 5:
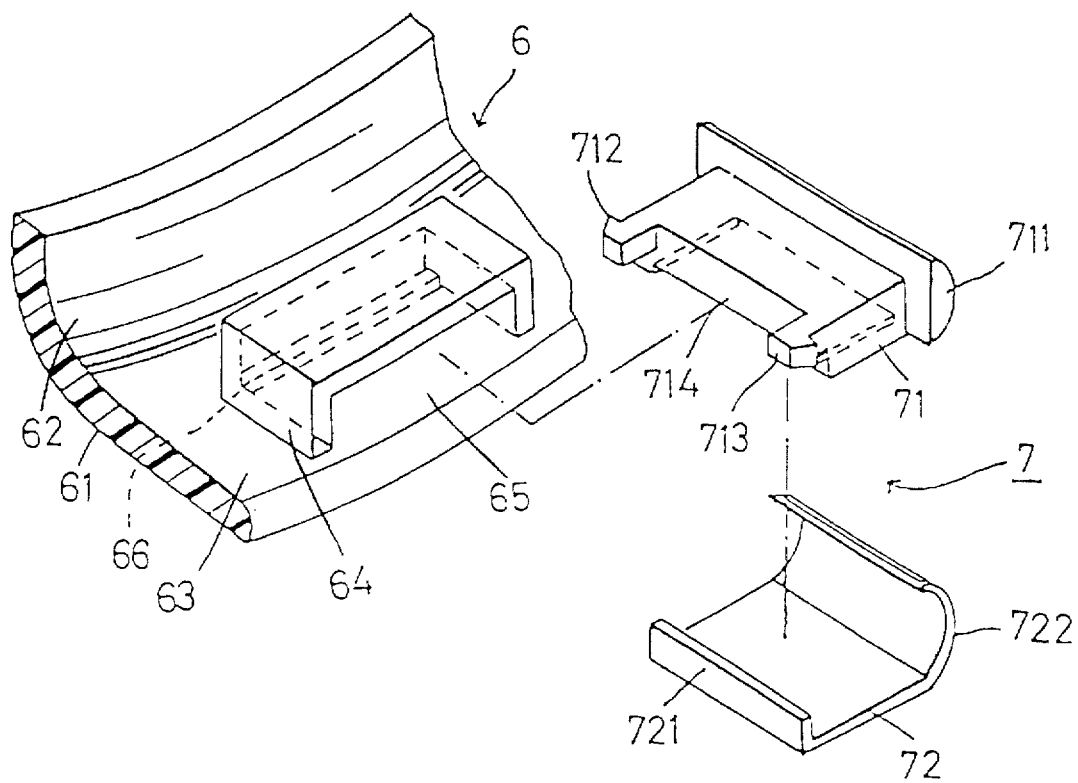
FIG. 5 is a partial isometric exploded drawing of the preferred embodiments of the invention herein when utilized on the wheel spoke cover.

Referring to FIG. 4, the preferred embodiments of the invention herein consists of numerous sets of mounting bases (64) and clasps (7) that comprise the clasp structure on the cover surface (61) and rear surface (62) of the wheel spoke cover (6) near the rim (63), and each clasp structure, as indicated in FIG. 5, the aforesaid mounting bases (64) positioned on the cover surface (61) and rear surface (62) of the wheel spoke cover (6) near the rim (63), has a mounting hole (65), and at the rear end of the mounting hole (65) of the mounting base (64) is a stop tab section (66). The aforesaid clasps (7) are comprised of an insertion lock tab (71) fabricated by bending and a curved retainer piece (72) formed by folding a metal strip; of which, the thickness and width of the aforesaid insertion lock tab (71) facilitates insertion into the mounting holes (65) of the aforesaid mounting bases (64) and there is a curved section at the outer end so that penetration into the insertion lock section (711) through the mounting holes (65) is not possible, and protruding from each of the two sides at the other end are the lateral hooks (712) of the clasp lock section (713), and at the lower side of the insertion lock tab (71) is a recess (714). The width and thickness of the aforesaid retainer piece (72) enables placement into the recess (713) of the aforesaid insertion lock tab (71) and, furthermore, one end of the retainer piece (72) is bent to one side to form a transfer stop section (721) and at the other end, bent in the same direction as the transfer stop section (721) to form a curvature, is a clip section (722).

Figure 6:
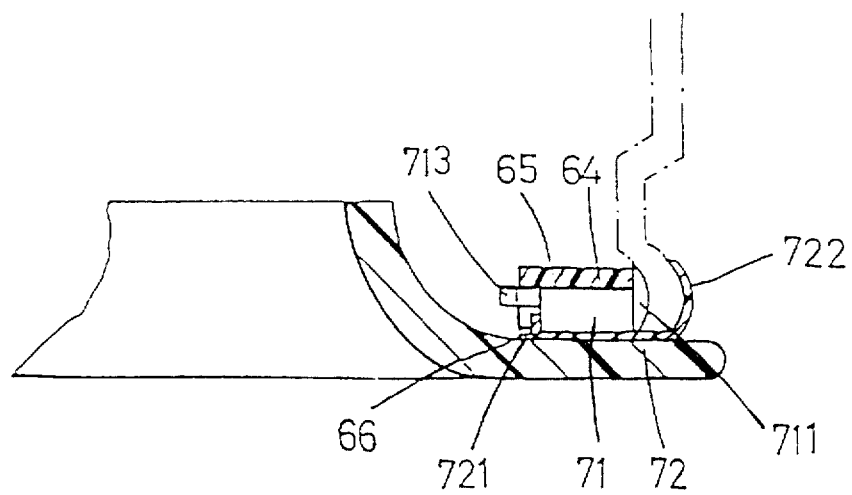
FIG. 6 is a cross-sectional drawing of the preferred embodiments of the invention herein as utilized on the wheel spoke cover.

Assembly consists of positioning the insertion lock tab (71) in between the transfer stop section (721) and the clip section (722), which causes the retainer piece (72) to be ensconced within the recess (714). During assembly, when the rear end of the insertion lock tab (71) is secured by the transfer stop section (721) of the retainer piece (72), an interval is maintained in between the insertion lock section (711) at the other end of the insertion lock tab (71) and the clip section (722) of the retainer piece (72) to accommodate insertion between the vehicle tire and the wheel rim. Following the positioning of the insertion lock tab (71) and the retainer piece (72), as indicated in FIG. 6, the entire assembly is inserted into the mounting holes (65) of the mounting bases (64), at which time, the lateral hooks (712) on the clasp lock section (713) at the rear end of the insertion lock tab (71) are secured in place by the mounting holes (65) and reactive changes in tensility and shape due to movement, enabling the forward movement of the insertion lock tab (71) up to the transfer stop section (721) of the retainer piece (72) when secured in the mounting holes (65) of the stop tab section (66), at which time, the lateral hooks (712) on the clasp lock section (713) at the rear end of the insertion lock tab (71) are subjected to force of tensile resilience, which causes a reactive movement outward against the rear edges of the mounting holes (65) and thereby enables overall anchoring. At this time, the interval in between the insertion lock section (711) on the insertion lock tab (71) and the clip section (722) on the retainer piece (72) provides for installation into the insertion clip slots of the vehicle tire and the wheel rim.

Regarding the example applications of the wheel spoke cover invention herein, if utilized in wheel rim covers, the only change necessary would be to position the mounting bases (64) onto the rear surface of the wheel rim covers near the outer circumference, with the remaining transfer stop section (72) structure remaining identical and, therefore, no further description is required.

The design of the invention herein includes the following advantages:

1. In packaging, the advantages are considerable. Other components can be packaged with the clasps (7) as accessories. If the clasps (7) are to be utilized on wheel rim covers, when the wheel rim covers are stacked, since there is no impact due to the physical projection of the clasps (7), therefore, the overall physical height of the aforesaid stack is diminished which, in addition to reducing the amount of space occupied in plant buildings, saves export shipping and repeated overland transport costs.

2. If the clasps (7) are to be utilized on wheel spoke covers (6), in addition to providing sufficient insertion force, the utmost in convenient assembly and disassembly is also provided for; during disassembly, it is only necessary to press inward on the two lateral hooks (712) of the clasp lock section (713) at the rear of the insertion lock tab (71), which will cause the release of all the clasps (7).

3. The assembly of the clasps (7) and the mounting bases (64) is very simple. Consumers can conveniently complete assembly after purchasing.

4. If the clasps (7) are to be utilized on wheel rim covers, then the original coil springs can be saved to save cost as well as allow easier assembly and disassembly.

While the invention herein has been described in relation to what is considered the most practical and preferred embodiments, the invention herein shall not limited to the disclosed embodiments in that the intention is to cover the various interpretations included within the principles and scope of the broadest interpretations and equivalent configurations thereof.

What is claimed is:

1. A wheel cover clasp structure comprised of a plurality of mounting bases positioned on the wheel cover, each mounting base having a front end, a rear end and a mounting hole, and a plurality of clasps, each clasp being connectable to a separate mounting base and including an insertion lock tab having an upper side and a lower side and a curved retainer piece, the insertion lock tab of each clasp being insertable into the mounting hole of the mounting base to which the clasp is connected, the insertion lock tab having at least two opposite sides, the insertion lock tab further including an insertion lock section at a first end and a clasp lock section having two lateral hooks each protruding from a separate one of the two opposite sides at a second end, the retainer piece having a first end bent to form a transfer stop section and a second end bent in the same direction as the transfer stop section to form a curved clip section;

wherein during assembly, each insertion lock tab is placed between the transfer stop section and the clip section of a separate retainer piece, and each retainer piece is inserted into the mounting hole of a separate mounting base so that the lateral hooks of the clasp lock section anchor each clasp to the mounting base, an interval between the insertion lock section of each insertion lock tab and the clip section of each retainer piece being established to retain the wheel cover on a wheel rim of a vehicle tire.

2. The wheel cover clasp structure as recited in claim 1 wherein each mounting base has a stop tab section at the rear end of the mounting base.

3. The wheel cover clasp structure as recited in claim 1 wherein the insertion lock section of the insertion lock tab of the clasp and the clip section of the retainer piece are each curved in shape.

4. The wheel cover clasp structure as recited in claim 1 wherein said insertion lock tab has a recess at the lower side of the insertion lock tab.

* * * * *